(No Model.) 2 Sheets—Sheet 1.
C. C. MURRAY.
BICYCLE.
No. 565,556. Patented Aug. 11, 1896.
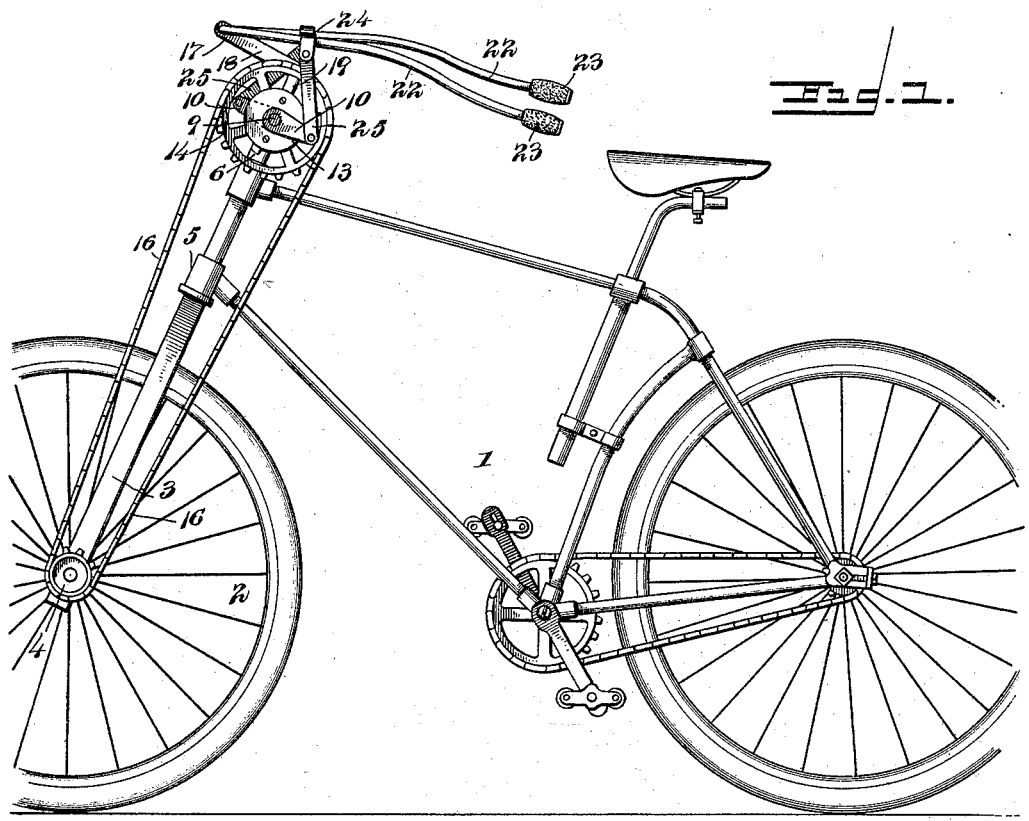
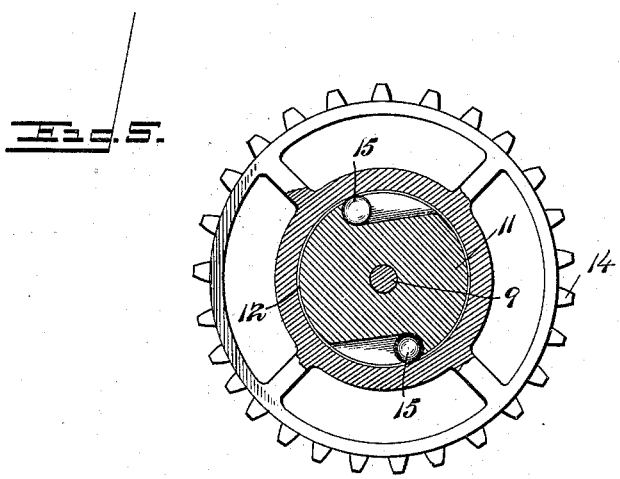
Witnesses
E. K. Stewart
R. M. Smith
Inventor
Charles C. Murray
By his Attorneys,
C. A. Snow & Co.

(No Model.) 2 Sheets—Sheet 2.
C. C. MURRAY.
BICYCLE.
No. 565,556. Patented Aug. 11, 1896.
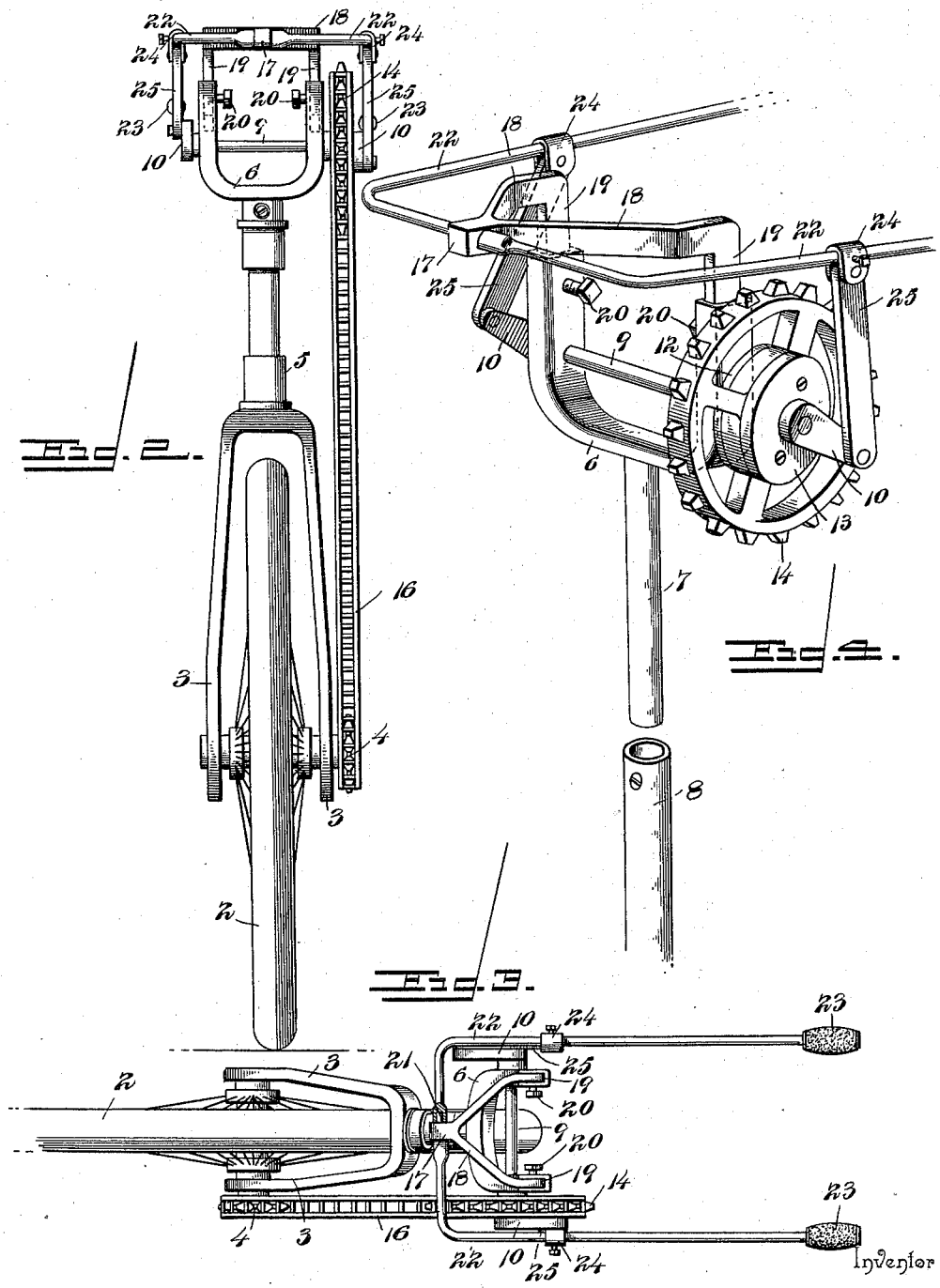
Witnesses
E. N. Stewart,
R. M. Smith.
Inventor
Charles C. Murray
By his Attorneys,
C. A. Snow & Co.

UNITED STATES PATENT OFFICE.

CHARLES CLARK MURRAY, OF NORTHBOROUGH, MASSACHUSETTS.

BICYCLE.

SPECIFICATION forming part of Letters Patent No. 565,556, dated August 11, 1896.

Application filed October 30, 1895. Serial No. 567,432. (No model.)

*To all whom it may concern:*

Be it known that I, CHARLES CLARK MURRAY, a citizen of the United States, residing at Northborough, in the county of Worcester and State of Massachusetts, have invented a new and useful Bicycle, of which the following is a specification.

This invention relates to an improvement in bicycles, and refers particularly to the driving mechanism thereof.

The object of the present invention is to provide a bicycle or vehicle of like character with driving mechanism independent of and supplemental to the usual foot-power mechanism, the same being operatively connected with the front or steering wheel of the machine, so that said wheel, as well as the rear or main driving-wheel, may be positively driven.

The invention contemplates the use of a novel frame connected with the steering-wheel, and in which the supplemental driving-gear may be mounted, and the further use in connection with said frame of an adjustable bracket for varying the height of the handle-bars to suit the size or convenience of the rider.

Other objects and advantages of the invention will appear in the course of the subjoined description.

The invention consists in certain novel features and details of construction and arrangement of parts, hereinafter particularly described, illustrated in the drawings, and finally pointed out in the claims.

In the accompanying drawings, Figure 1 is a side elevation of a bicycle, showing the application of the present improvements thereto. Fig. 2 is a front elevation of the same. Fig. 3 is a plan view of the front portion of the machine. Fig. 4 is a detail perspective view of the specially-constructed steering-head, showing the means for adjusting the fulcrums of the handle-bars or levers. Fig. 5 is a sectional view taken through the driving-sprocket, showing the clutch mechanism therein.

Similar numerals of reference designate corresponding parts in the several figures of the drawings.

Referring to the accompanying drawings, 1 designates a bicycle of the safety pattern having the usual front steering-wheel, rear driving-wheel, and the pedal-shaft arranged between the wheels and connected by a drive-chain with the hub of the rear driving-wheel, whereby the machine is adapted to be driven by foot-power in a manner well understood in the art to which this invention appertains.

2 indicates the front or steering wheel, which in the present instance is mounted fast upon its axle, the latter being journaled to revolve in bearings at the lower extremities of the arms 3 of the front fork, said shaft having a sprocket-pinion 4 fast upon one extremity thereof and arranged exteriorly of one of the fork-arms.

The fork 3 may be of any usual or preferred form, and extends upwardly through and is swiveled in the tubular head 5 of the machine-frame, above which it is connected with a U-shaped frame-piece 6, forming a part of the steering-head of the machine. This U-piece is provided with a central pendent stem 7, which enters the fork-stem 8, the latter being made hollow or tubular for the purpose, the object of this construction being to render the fork and the U-piece separable for removal from the machine-frame when necessary. Adjacent to their upper ends the outwardly-extending arms of the U-piece 6 are expanded in width and provided with bearing openings for the reception of a transversely-disposed shaft 9, to each extremity of which is secured a crank 10, said cranks extending in opposite directions, as shown.

Upon one end of the shaft 9 and upon the same side of the machine as the sprocket-pinion 4, is rigidly secured a clutch-hub 11, having at one side a circumferential flange 12, formed integrally therewith, and having secured to its opposite face a removable disk 13, which projects beyond the periphery of the hub 11 a distance approximately equal to the flange 12. A grooved friction-hub is thus formed, and upon this hub is loosely journaled the main driving sprocket-wheel 14, the same being in vertical alinement with the sprocket-pinion 4 on the axle of the front or steering wheel 2. The hub 11 is provided in its periphery and at diametrically-opposite points with tangentially-disposed grooves or sockets, in which are arranged clutching devices in the form of balls 15. By reason of the tangential relation of these grooves or sockets, when the shaft 9 and the hub 11, fast thereon, are rotated in one direction, (forward,) the balls 15 will bind against the inner face of the sprocket-wheel 14 and thereby cause said sprocket-wheel to rotate with the shaft. At the same time, when the rider ceases applying power to the shaft 9, the sprocket-wheel 14 is left free to revolve independently of said shaft and its hub. Power is communicated from the sprocket-wheel 14 to the sprocket-pinion 4 by means of a drive-chain 16.

17 designates a vertically-adjustable bracket, which comprises a pair of rearwardly-diverging arms 18, having at their rear extremities depending stems or posts 19, which enter sockets in the upper ends of the arms of the U-shaped frame 6, said stems or posts being vertically adjustable and capable of being held at any desired adjustment by means of set-screws 20, passing through the arms of the U-piece 6 and binding against said stems. At the front end of the bracket 17 is located a transverse shaft 21, which projects equally upon opposite sides of the bracket and forms the common fulcrum upon which an oppositely-disposed pair of lever-arms or handle-bars 22 are mounted. These handle-bars are preferably made of steel tubing, and at their front ends are deflected inwardly toward each other and passed over the laterally-projected ends of the shaft 21, being secured in any convenient manner. The said handle-bars extend rearwardly and are provided at their rear ends with suitable handles 23, arranged within convenient reach of the rider while in his seat upon the machine. Intermediate its ends, each of said handle-bars or levers has adjustably secured thereto a bifurcated bearing-piece 24, which may be adjusted to the desired point longitudinally of its respective handle-bar section, and held by means of a set-screw, as shown. This bearing-piece receives pivotally the upper end of a link or rod 25, which connects pivotally at its other end with the outer end of the crank 10, fast upon the shaft 9 on that side of the machine. In this manner motion is readily communicated to the transverse shaft 9, and thereby to the main driving-sprocket 14, and thence through the drive-chain 16 to the sprocket-pinion 4 on the axle of the front or steering wheel.

From the foregoing description it will be apparent that the front or steering wheel of an ordinary safety-bicycle may be driven simultaneously with the rear or main driving-wheel, thus utilizing the muscles of the arms in addition to those of the legs. It is thus possible for the rider upon coming to a steep incline to bring into play the combined power of both his arms and legs, thus enabling him to ascend the incline with greater ease. By reason of the increased power it is also possible to gear the driving mechanism to a higher speed, so that in traveling along level and smooth roads the use of the hand driving mechanism may be temporarily abandoned and the foot-power alone resorted to, it only being necessary to use the hand-power upon special occasions, similar to that above noted. By the construction described it will also be seen that the handle-bars may be adjusted as to their elevation for the obvious purpose of adapting said handle to the use and convenience of riders of different sizes.

The supplemental hand driving mechanism hereinabove described adds very little to the total weight of the machine while giving the rider a material advantage in traveling over rough roads, in hill climbing, and in covering great distances, in the latter event the rider when greatly fatigued being enabled to alternately use the hand and foot power mechanism.

Changes in the form, proportion, and minor details of construction may be resorted to without departing from the spirit or sacrificing any of the advantages of this invention.

Having thus described the invention, what is claimed as new is—

1. In a bicycle-driving mechanism, the combination with the steering-head, machine-wheel, and sprocket-wheel connected rigidly with said machine-wheel, of a transverse shaft mounted in said steering-head, a forwardly-extending bracket adjustably connected with said steering-head, and a pair of vibratory handle bars or levers fulcrumed upon said bracket and having a link-and-crank connection with said transverse shaft, which in turn carries a sprocket-wheel from which motion is communicated to the machine-wheel by a suitable drive-chain, substantially as and for the purpose specified.

2. In a bicycle-driving mechanism, the combination with the front steering-wheel, and the steering-head in which said wheel is mounted, of a transverse shaft journaled in said steering-head, a bracket capable of being adjusted vertically with relation to said head and projecting forwardly therefrom, a pair of handle-bars or levers fulcrumed on the forward end of said bracket and having a link-and-crank connection with said shaft, a sprocket-wheel having a clutch connection with said shaft, and a drive-chain extending from said sprocket-wheel over a sprocket-wheel on the steering-wheel, all arranged for joint operation, substantially as described.

In testimony that I claim the foregoing as my own I have hereto affixed my signature in the presence of two witnesses.

CHARLES CLARK MURRAY.

Witnesses:
LENA C. WHEELER,
NELLIE RILEY.